US009706613B2

(12) United States Patent
Gibbs

(10) Patent No.: US 9,706,613 B2
(45) Date of Patent: Jul. 11, 2017

(54) LED DRIVER OPERATING FROM UNFILTERED MAINS ON A HALF-CYCLE BY HALF-CYCLE BASIS

(71) Applicant: Emeray, LLC, Meriden, CT (US)

(72) Inventor: Duane Gibbs, Tustin, CA (US)

(73) Assignee: Emeray LLC, Meriden, CT (US)

( * ) Notice: Subject to any disclaimer, the term of this patent is extended or adjusted under 35 U.S.C. 154(b) by 0 days.

(21) Appl. No.: 14/688,731

(22) Filed: Apr. 16, 2015

(65) Prior Publication Data

US 2015/0312987 A1 Oct. 29, 2015

Related U.S. Application Data

(63) Continuation-in-part of application No. 14/611,053, filed on Jan. 30, 2015, which is a continuation-in-part of application No. 14/227,996, filed on Mar. 27, 2014, now abandoned, which is a continuation of application No. 13/068,844, filed on Mar. 3, 2011, now Pat. No. 8,704,446.

(60) Provisional application No. 61/310,218, filed on Mar. 3, 2010, provisional application No. 61/986,664, filed on Apr. 30, 2014.

(51) Int. Cl.
 *H05B 33/08* (2006.01)

(52) U.S. Cl.
 CPC ..... *H05B 33/0815* (2013.01); *H05B 33/0827* (2013.01); *H05B 33/0848* (2013.01); *H05B 33/0887* (2013.01)

(58) Field of Classification Search
 CPC .. H05B 41/34; H05B 33/0803; H05B 37/029; H05B 33/0815; H05B 33/0827; H05B 33/0848; H05B 33/0887; B23K 11/248
 USPC ............ 315/209 R, 291, 307, 308, 360, 122
 See application file for complete search history.

(56) References Cited

U.S. PATENT DOCUMENTS

| 6,952,334 | B2 | 10/2005 | Ball et al. | |
|---|---|---|---|---|
| 7,583,035 | B2 | 9/2009 | Shteynberg et al. | |
| 2004/0140774 | A1 | 7/2004 | Chang | |
| 2010/0259188 | A1 | 10/2010 | Cheng et al. | |
| 2010/0295460 | A1 | 11/2010 | Lin et al. | |
| 2013/0271041 | A1* | 10/2013 | Chiu | H05B 33/0851 315/308 |
| 2015/0137688 | A1* | 5/2015 | Gibbs | H05B 33/0815 315/186 |

* cited by examiner

*Primary Examiner* — Daniel D Chang
(74) *Attorney, Agent, or Firm* — George P. White

(57) ABSTRACT

An analog electronic circuit for driving a string of LEDs including input terminals for accepting connection to AC voltage, a current regulation circuit operatively coupled to receive an AC voltage from the input terminals and to provide an output for connection to drive the string of LEDs. Included is a current regulation circuit configured to limit the current flow through the string of LEDs on a half-cycle basis to a predetermined value. Also disclosed are an overvoltage circuit configured to switch off electrical connection between the AC voltage and the string of LEDs upon the AC reaching a predetermined high voltage value on a half-cycle basis in order to limit power. Overtemperature and power factor correction are also addressed. Also improving efficiency by shorting part of the LED string during the lower voltage phase of the input AC voltage.

5 Claims, 17 Drawing Sheets

LED DRIVER OPERATING FROM UNFILTERED MAINS ON A HALF-CYCLE BY HALF-CYCLE BASIS

RELATED APPLICATIONS

This application is a continuation-in-part of, and claims a priority benefit, under 35 U.S.C section 120, from nonprovisional U.S. application Ser. No. 14/611,053 filed on Jan. 30, 2015; that in turn claims a priority benefit, under 35 U.S.C section 120, from U.S. Ser. No. 14/227,996 filed on Mar. 27, 2014; that in turn claims a priority benefit, under 35 U.S.C section 120, of U.S. Ser. No. 13/068,844, filed on Mar. 3, 2011, now U.S. Pat. No. 8,704,446; that in turn claims a priority benefit, under 35 U.S.C section 119(e), from U.S. Provisional Application No. 61/310,218, filed on Mar. 3, 2010. This application also claims a priority benefit, under 35 U.S.C section 119(e), from U.S. Provisional Application No. 61/986,664, filed on Apr. 30, 2014. All contents of these applications are hereby, herein incorporated by reference in their entireties.

FIELD

This disclosure concerns analog circuitry for reliably powering LEDs from AC mains.

BACKGROUND

It has been predicted that solid-state lighting using light emitting diodes will eventually take over most of the applications now occupied by conventional lighting technology. A major attraction of LED lighting is reduced energy costs due to having inherently greater efficiency than incandescent, fluorescent and high-energy discharge lighting. Other attractions are that LEDs potentially have a much greater life span than the alternatives and do not contain hazardous chemicals such as the mercury used in fluorescent bulbs.

Two current disadvantages of LED lighting are the high cost of the LEDs themselves and the fact that many implementations do not live up to the often-claimed 50K+ hour lifetimes. To address this second issue the driving circuitry sophistication needs to be improved while keeping the cost low and, for practical reasons, the space taken by the controller small. Reliability issues with LED driving circuitry include failures in components such as large electrolytic capacitors used to produce DC voltages for LEDs. Their limited life becomes even shorter as ripple current increases, calling for even larger capacitors. Other contributors to a shorter lifetime are LEDs being stressed by overheating, overvoltage, or current spikes in excess of their maximum ratings. As the price of LEDs comes down the cost of the driving circuitry becomes relatively more important to the total consumer price, but the sophistication of the drive circuit needs to be higher than many circuits currently in use to ensure a long lifetime.

LED current is often regulated with a high frequency switching regulator that uses an inductor and capacitor as storage elements and a flyback diode to recirculate current between switching cycles. Switching regulator circuits are often chosen due to having higher efficiency than most non-switching designs. However, switching regulators have a number of disadvantages that can require additional circuit costs. Switchers create high frequency electromagnetic interference (EMI) that needs to be filtered in order to meet FCC regulations, for example. Also, the switching power supplies can create harmonic distortion in the current drawn from the power line. This is primarily seen as peak currents much greater than the root-mean-square (RMS) current and is drawn primarily at the peak of the AC voltage sine wave due to the capacitive current inrush on each AC cycle. This phenomenon undesirably lowers the Power Factor.

Power Factor is the ratio of real power in watts to apparent power in voltamps (VA). If the effective load of an LED lamp is inductive or capacitive then the Power Factor will be less than the ideal 1.0. Additional circuitry may be needed to correct the Power Factor (PF) of the lamp to meet utility company regulations.

In a lighting system that uses either a switcher or a conventional power supply to produce a DC rail, the PF is typically much less than optimum due to the power supply's input and output filter capacitors. As mentioned, these capacitors draw large peak current near the peaks of the input line voltage and much less between peaks. These distortions show up in the voltage and current frequency spectrums of the system as increased odd harmonics. In the usual lighting installation the power supplied is singlephase 120 VAC or 220 VAC connected phase to neutral. In this case the harmonic distortions will be additive on the neutral and can cause the neutral current to be up to 1.73 times greater than the phase current. This can cause the neutral to overheat even when the load is within the rating of the service. There is a need for circuits for driving LEDs that control the current and do not have inherent EMI and PF problems.

SUMMARY

This disclosure includes several versions of a simple but sophisticated, low cost light emitting diode (LED) driver circuit designed to interface directly with the AC mains voltages. An analog electronic circuit can take unfiltered mains voltage and apply it to a string of LEDs through a current regulator that can keep the LED current constant once it reaches a desired level. This happens on a half cycle-by-half cycle basis. The current regulator can have a high impedance, low voltage control point configured to be driven by one or more open collector control signals. If there is more than one control signal they can be wire-ORed through respective isolating diodes. In these circuits any of the wire-ORed signals can be used to independently reduce or shut down the current.

In some versions the circuitry can have a power limit protection via voltage sensing, an overtemperature circuit, a power factor correction circuit, and/or a dimming circuit. These features can be present in any combination. Other ancillary circuits disclosed include providing higher efficiency and implementing a 3-way bulb replacement. All of these circuits have embodiments where circuitry can be free of any requirement for a steady DC voltage to power either the LEDs or the various control circuits.

A low voltage control point is a circuit node not requiring a high-voltage circuit to drive it. In this context, low voltage is in contrast to the high voltage of the AC mains used to power the circuits of the embodiments. In many circuits a low-voltage control point may nominally be about 5 volts. A high impedance control point is a circuit node that can be taken to ground without excessive current flow. As an example, the transistor 2N3900 has a specified maximum collector current of 100 mA and a maximum emitter to collector voltage of 18V. This would be more than sufficient

BRIEF DESCRIPTIONS OF THE DRAWINGS

DETAILED DESCRIPTION

Introduction

The circuitry described can provide low cost methods of connecting Light Emitting Diodes to standard mains level AC service while providing current regulation and optionally, overvoltage protection. They have the advantage of simplicity and potentially much lower cost than other regulated methods. These circuits have a relatively high Power Factor due to requiring no large reactive components. In some versions additional circuitry is included to further improve the power factor. The circuits shown and described include those with inherently lower harmonics than switching regulators, consequently having low EMI.

Many alternate designs are presented. These designs do not attempt to provide a steady, level, DC supply to strictly regulate the current and voltage applied to the lighting elements. Instead, embodiments of the circuitry are exposed to, and operate over, the complete 360-degree sine wave of the power source. In this document "directly from AC mains" means a circuit capable of operating at 110 VAC to 250 VAC without requiring the AC to be converted to DC before the circuit can use the voltage, and also without needing the AC voltage to be stepped down to a lower voltage. Rectification, either half-wave or full wave, may be present and while no large filter capacitors are required, small noise reducing and stabilizing capacitors may be present.

Figure 1:
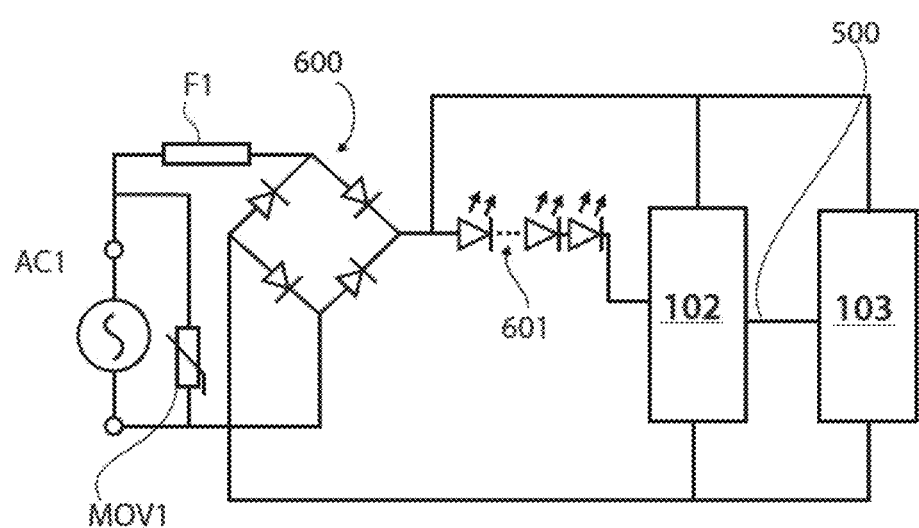
FIG. 1 is a block diagram of a circuit using unfiltered AC that controls the current through LEDs and protects against overvoltage.
Figure 2:
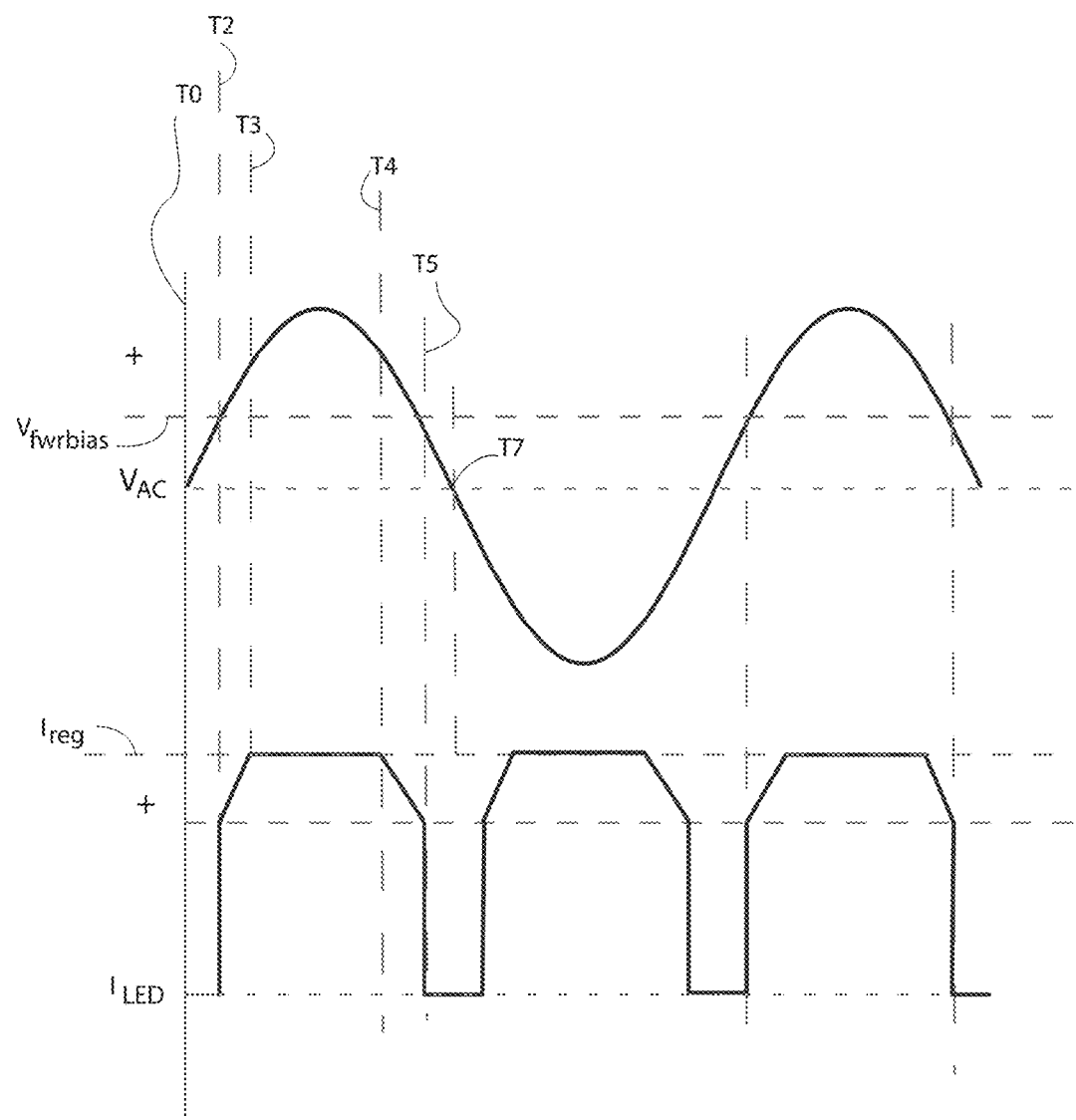
FIG. 2 shows voltage and current waveforms during the operation of the circuit of FIG. 1.

The following will be better understood by consulting FIG. 1 and FIG. 2. The block diagram drawing of FIG. 1 shows four major sections, (1) a full wave bridge rectifier (600) getting input directly from the mains voltage, (2) a string of LEDs (601), (3) a current regulator (102), and (4) an overvoltage detector (103). If the AC voltage were filtered to a steady DC level this circuitry might seem conventional, but these teachings involve circuits not requiring a DC rail either for the LED current or to power control circuitry. In fact, the control circuits in the presented embodiments are designed to be de-powered and re-powered 120 times a second. The powering down occurs during the time the sine wave voltage is about + or −3 volts of its zero crossing.

Current Control

Consulting FIG. 2 the AC input sine wave $V_{AC}$ starts a new cycle at time $T_0$. When $V_{AC}$ reaches a high enough level (~3V), the circuitry in blocks 102 and 103 become powered-on and monitors the current and voltage. Since the circuit is a straightforward analog circuit without memory there is no turn-on discontinuity or problem.

Inherent in the nature of diodes, no current flows through the LED series string (601) until the input voltage is greater than the sum of the minimum forward bias voltages of the string of LEDs. This level is marked as $V_{fwr\ bias}$ in FIG. 2. The input sine wave $V_{AC}$ reaches this at time $T_2$ as seen in the $I_{LED}$. This is the first time current that flows through the LEDs. As the voltage increases along a sine wave ramp the current correspondingly ramps up in a sine wave ramp. The current will be below the current regulation point over the range where the applied voltage is too small to achieve the desired current regulation point.

The current regulator 102 has a predetermined setting to a desired regulated value of current through the LED string. This level is shown as $I_{REG}$ in FIG. 2. When the current reaches the set point of regulation at time $T_3$, the current is held to that value by the current regulator as seen by the flat top of the FIG. 2 $I_{LED}$ waveform. While the AC voltage exceeds the voltage required to produce the set point current, power is dissipated in the current regulator. At time $T_4$, $V_{AC}$ falls below the quantity required to produce the set point amount of current and the sequence of actions reverses.

A decreasing amount of current flows through the LEDs until the applied voltage is less than the sum of the forward bias voltages $V_{fwr\ bias}$ at time $T_5$. At about three volts the control circuitry stops functioning. Again, this causes no discontinuity. The current $I_{LED}$ through the LEDs stays at zero thorough the end of the half-cycle at time $T_7$. These steps reoccur for each half cycle. The current $I_{LED}$ is shown flowing in FIG. 2 during both phases of the AC input due to the full wave rectifier between the AC input and the rest of the circuit.

The voltage detector 103 circuit is discussed below in the context of a fleshed out schematic.

Specific Circuitry

Figure 3:
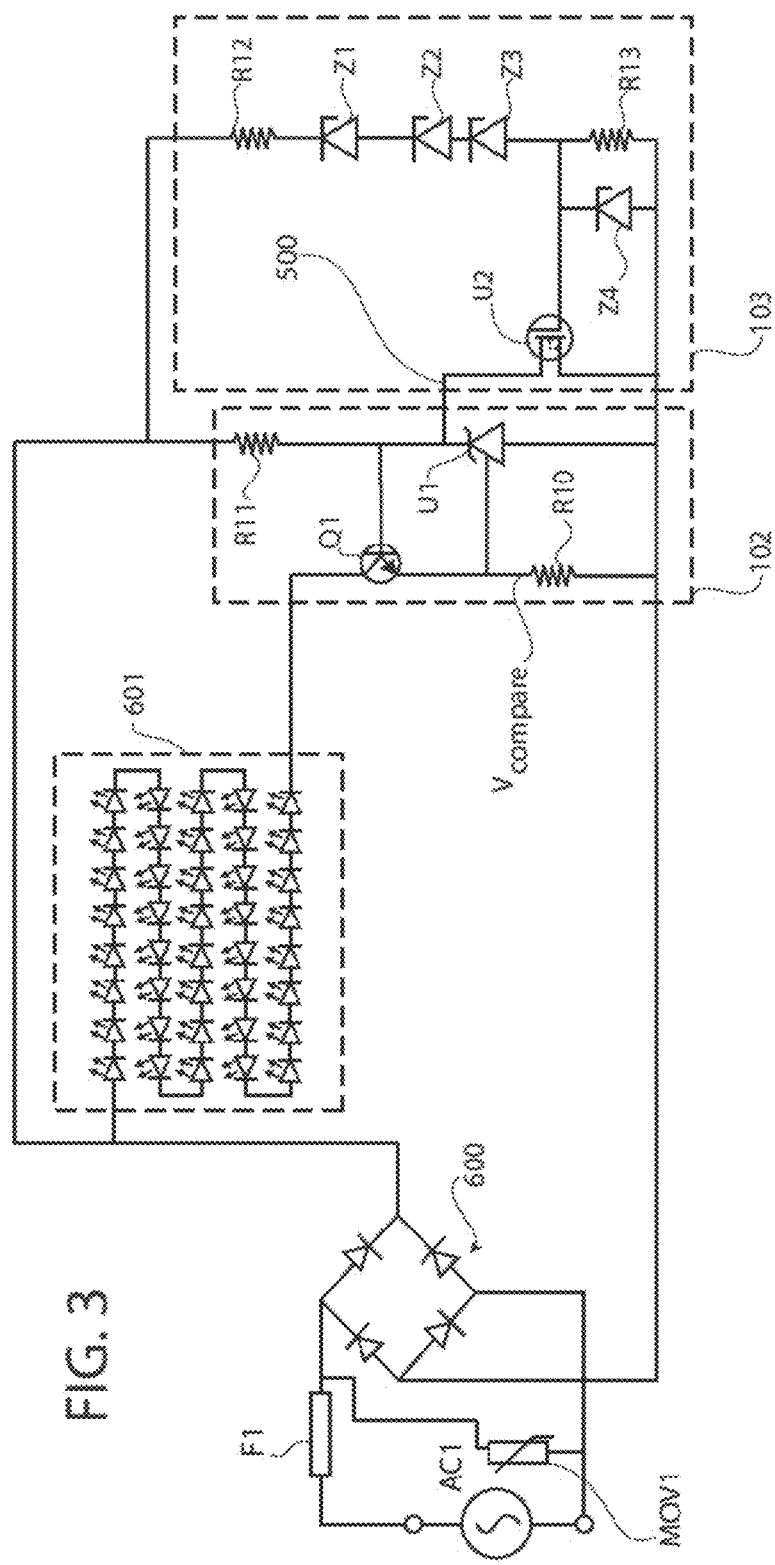
FIG. 3 is a detailed schematic of a circuit corresponding to the block diagram of FIG. 1.

FIG. 3 shows a detailed schematic of a circuit corresponding to the block diagram of FIG. 1. The current regulator section 102 is formed around a precision adjustable shunt voltage regulator U1. The shunt regulator is a three terminal Texas Instruments TL431. It varies its conduction of current between its cathode and anode to keep its control reference input equal to a fixed internal reference voltage. In this circuit it is configured with high-voltage NPN transistor Q1 and resistors R10 and R11 as a constant current sink from the cathode of Q1 back to the voltage source return.

The voltage, $V_{SENSE}$ across the sense resister R10 is compared within the shunt regulator with an internal voltage reference (typically 2.50V or 1.49V) and when the sensed voltage begins to exceed this voltage the shunt regulator begins to reduce the base current available to the NPN transistor Q1 and this folds back the current flow of the LED string using this negative feedback effect. The current regulation point is set by sense resistor R10 and by the formula: I_setpoint=Vref/Rsense. This circuit can variously be called a current regulator a constant current sink or a current limiter. In most applications of a circuit like this the goal is constant current. In this application it is a constant value or less.

Q1 should have a collector emitter breakdown voltage rating higher than the highest expected peak spike or surge it will be exposed to from the mains. In the FIG. 3 circuit, that quantity is limited by MOV1. In a nominally 117 V environment, the MOV's clamping voltage can be 230 volts. In that case a FZT458 with a breakdown voltage of 400V would be suitable as Q1.

Voltage detection and Power Protection

One element in FIG. 1 that has not been discussed is the overvoltage detector (OVD) 103. It is connected the voltage supplying the LEDs and measures the voltage to detect it exceeding a predetermined limit. When it does, the voltage detector shuts off the current regulator completely via an open collector control point 500.

The purpose of the overvoltage detection circuit is not to protect any component directly from too high a voltage. Reducing the current to zero does not change the voltage across Q1. As mentioned, the MOV and Q1 breakdown voltage are chosen to accomplish that protection. A large current will pass through the MOV until the voltage spike has passed, on a cycle-by-cycle basis and if the total duration on is long enough to overheat the fuse, the fuse will open. The fuse also protects against over current conditions due to a failure in the circuit by opening the path to the mains protecting the circuit. This fuse use can be a onetime acting component or a resettable fuse that will automatically close once the over current condition has passed.

Figure 4:
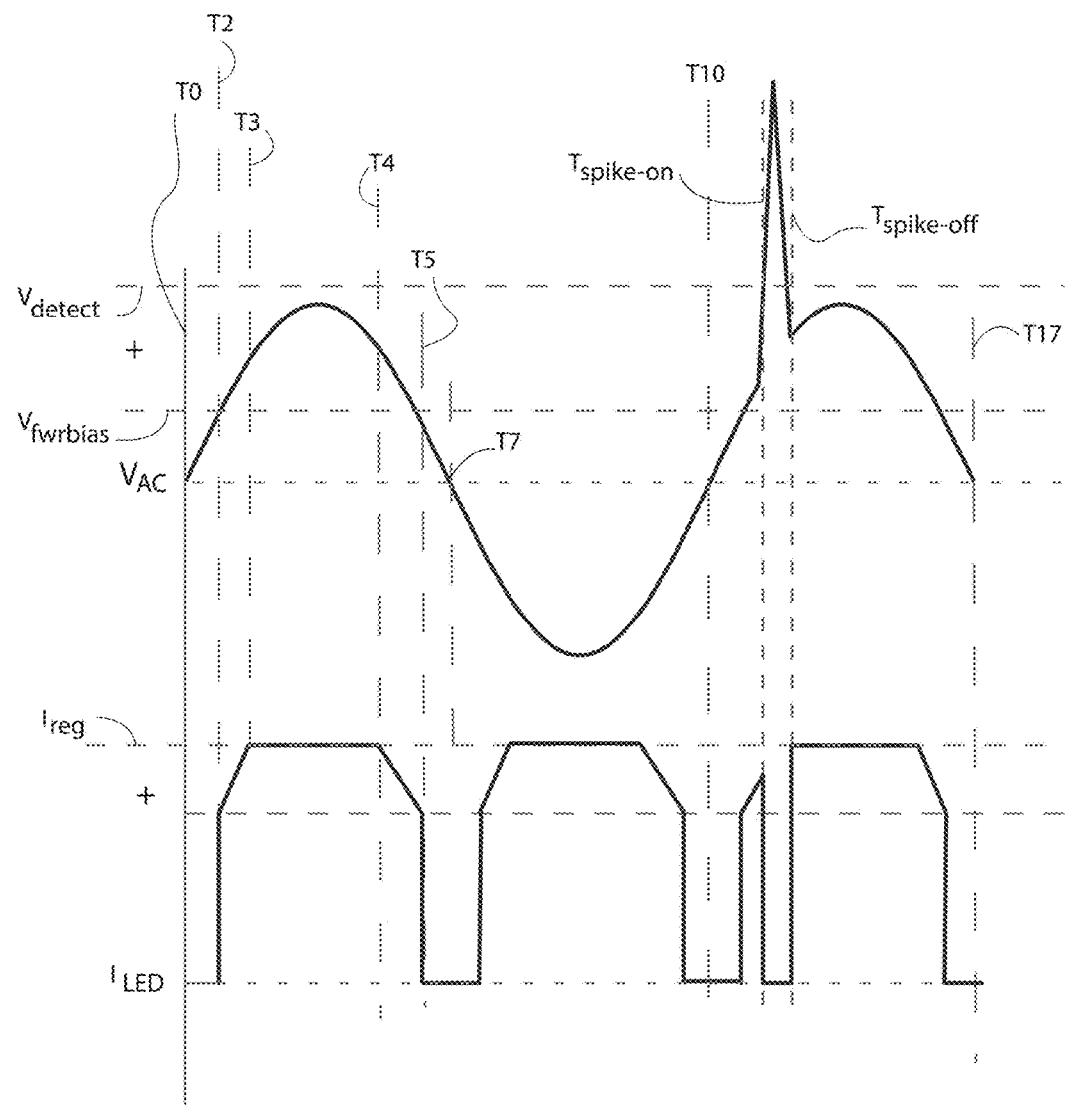
FIG. 4 shows the voltage and current waveforms of FIGS. 1 and 3 in the case of an overvoltage condition.

The voltage detection circuit is to protect the power transistor from being required to dissipate power beyond its specifications when the AC mains voltage surges or spikes. The overall function of this aspect of the circuitry is better understood while consulting FIG. 4. These waveforms are similar to the previous waveform figures in FIG. 2 but with the addition of portraying a voltage spike on the AC voltage.

In the first two half-cycles the voltage and resulting current are as in FIG. 2. However in the third half-cycle at time $T_{spike-on}$ $V_{AC}$ input spikes significantly above its nominal value. This is detected by circuit 103 that completely shuts off the current regulator until the voltage falls back below the OVD's cut-off point at $T_{spike-off}$. The current shut off prevents Q1 from being required to dissipate more power than it is specified to handle. A spike is shown for ease of explanation, but exceeding a power dissipation specification for a few milliseconds is normally not a big problem. The OVD is more important in a surge, in a flood of spikes, or a longer length overvoltage condition.

Details of OVD Circuit

The OVD shown in FIG. 3 is connected to the bridge rectifier through bias resistor R12. The Zener diodes Z1, Z2 and Z3 are stacked together to set the voltage detection point. The stack of three Zeners is used in this example since they can have a lower total cost than one large voltage Zener due to the way the semiconductors are manufactured. For a nominal 117 VAC application, the set point voltage should be 165V. To avoid the OVD circuit turning on with normal voltage variations, but to ensure that it turns on before Q1's maximum power dissipation is exceeded, the set point voltage can be set about 10% higher than this at 182V. The bias resistor R12 sets the nominal Zener current and absorbs the excess voltage during a voltage surge. Zener diode Z4 limits the peak voltage at the gate of an N-channel MOSFET U2 below its maximum rating and gate resistor R13 going from the MOSFET's gate to the voltage return pulls the gate voltage back down to zero when the overvoltage condition passes. MOSFET part number ZXMN2A02N8 would be a suitable component.

Figure 5:
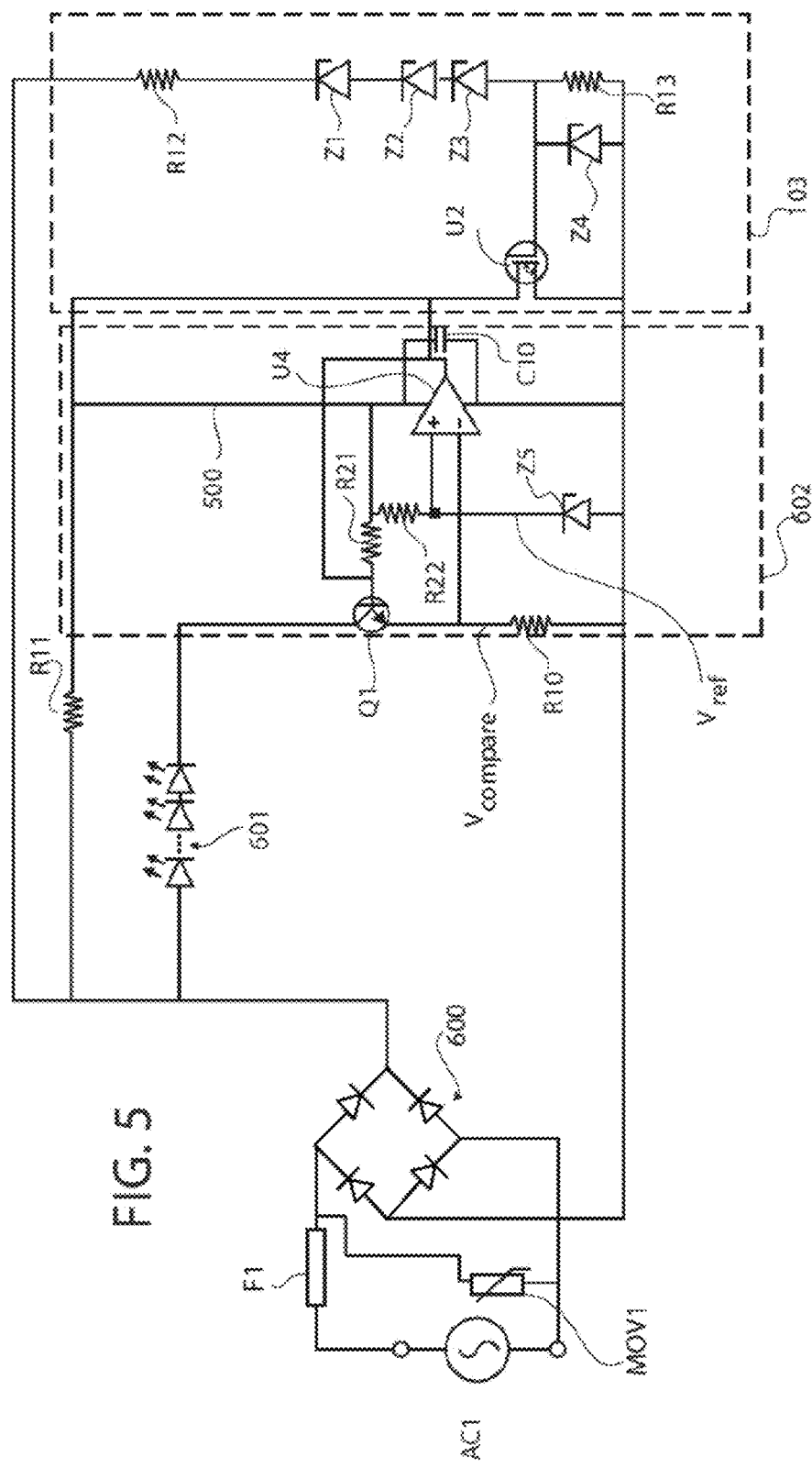
FIG. 5 is a schematic of a first alternate circuit embodiment of the block diagram of FIG. 1 using a comparator.

FIG. 5 shows circuit very similar to FIG. 3 but with the current regulator 602 created from a comparator and an NPN transistor. This current regulator replaces the adjustable shunt voltage regulator used in the current regulator circuitry shown in FIG. 3. The function of this circuit is described next. As the LED current increases due to the increasing sine wave of the AC input voltage, the voltage drop $V_{COMPARE}$ across sense resistor R10 increases. The voltage across R10 is applied to the inverting input of comparator U4. The noninverting input of U4 is connected to a voltage reference Zener Z5 to set the maximum voltage across $V_{REF}$ (typically about 2V). Resistor R11 supplies bias current for the current regulator circuit 602. The voltage from R11 also powers the comparator and raises $V_{REF}$ via its biasing resistor R22. The output of the comparator will initially be high impedance since no or low current flowing in R10, its negative input voltage $V_{COMPARE}$ is lower than $V_{REF}$. This high impedance output allows the NPN transistor $Q_1$ (a FZT458 or equivalent) to be turned on by current flowing into the base through R11 and R22. This pulls its collector down close to its emitter potential. LED current will then flow once the sine wave voltage from the bridge output is high enough to supply the minimum required voltage across the LEDs 601 for them to begin conducting. When the LED current passing through sense resistor R10 causes $V_{COMPARE}$ to exceed the reference voltage $V_{REF}$, the output of comparator U4 will go low and begin to reduce the base current available to the NPN transistor $Q_1$. This negative feedback effect folds back the current flow to the LEDs and limits it to a maximum current. The maximum current $ILED_{peak}$ is set by the value of the sense resistor R10 and the voltage $V_{REF}$ by the formula:

$$ILED_{peak}=V_{ref}/R_{sense}.$$

When the AC mains voltage sine wave drops far enough back towards zero, the LED current reduces due to Q1 increasing resistance caused by U4 starting to turn it off, and Vcompare will begin to reduce below the reference voltage. Then the comparator U4 output will again go high allowing increase base current to Q1 and begin reducing the voltage drop collector to emitter of Q1 to control the current flow. Capacitor C10 supplies filtering across the comparator's power connection's to prevent oscillations. It is not intended to keep a steady DC supply for the comparator during the AC cycle. As mentioned elsewhere, in many embodiments there is no requirement to keep a steady DC supply on any components. The purpose of the overvoltage detection circuit 103 as in FIG. 5 is to protect the LEDs and power transistors from the effects of voltage surges originating from the AC line. It is the same circuit as shown in FIG. 3 as explained above.

Figure 6:
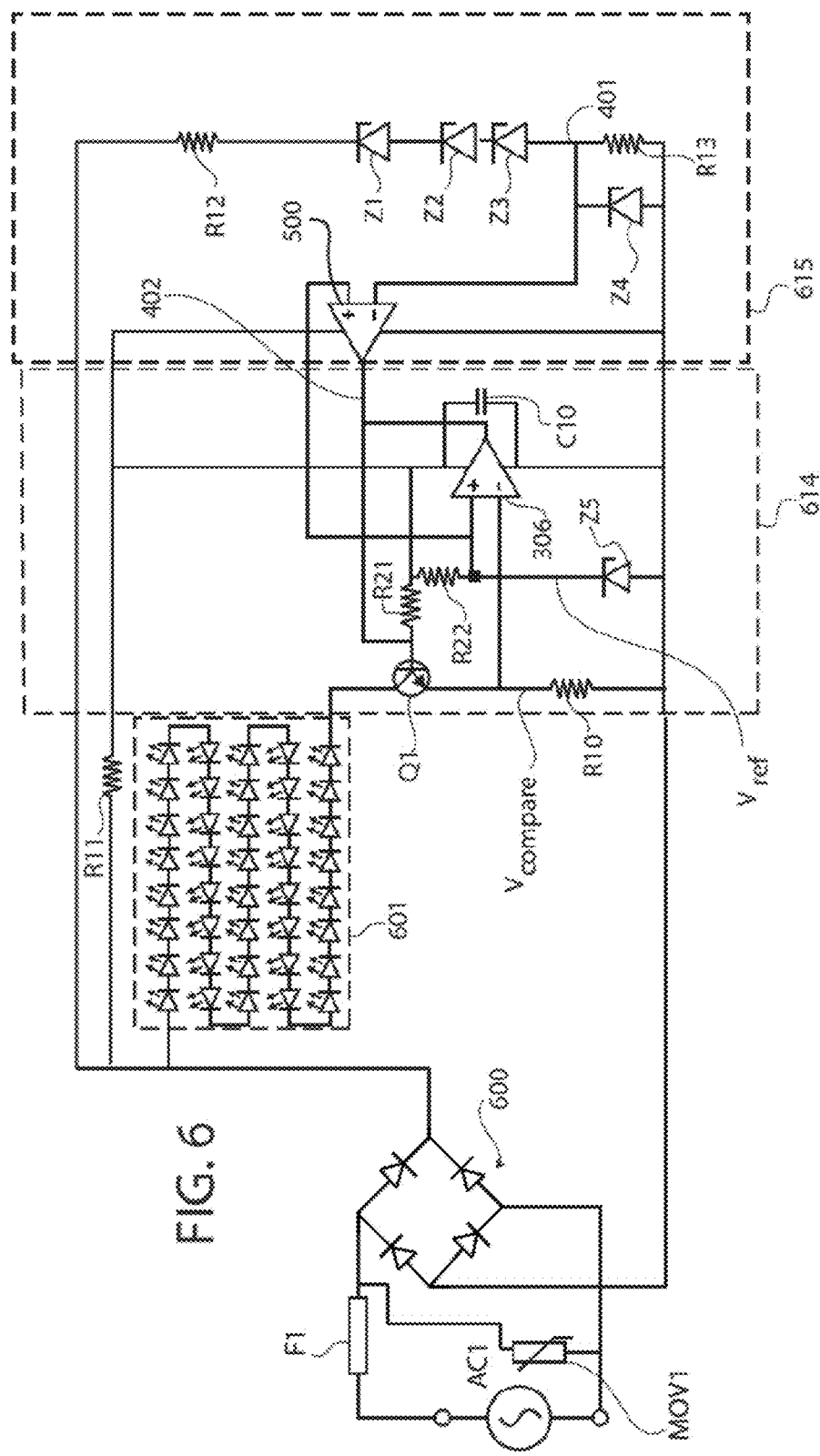
FIG. 6 is a schematic of a second alternate circuit embodiment of the block diagram of FIG. 1 using two comparators, with one half of a dual comparator IC used in the current regulation circuit and the other half in used in voltage detection.

FIG. 6 shows an alternate circuit with similar operation as the circuit of FIG. 5. An open collector (drain) comparator IC with two comparators is used in both the LED current regulator 614 and voltage limiter 615 circuits. One comparator 306 is set up as before as the core of the current limiter as in FIG. 5 and the second comparator 500 replaces the N-Channel MOSFET from FIG. 5 to perform the voltage limiting function. The voltage reference $V_{COMPARE}$ used by the current regulator also supplies the reference level at the non-inverting pin of the comparator 500. The overvoltage signal is produced by the same method with stacked Zener diodes Z1 Z2 Z3 through defining the overvoltage level and Z4 providing voltage limiting to the inverting pin of 500. Resistor R12 connects the Zener string to the sensed voltage at the output of the bridge rectifier 600 and also limits the Zener current. Bleed resistor R13 pulls the inverting input back down towards ground after each half sine wave phase to reset the overvoltage circuit 615.

Initially with low to normal voltages, the voltage at the inverting input of 500 will be less than the reference voltage at the noninverting input and this will result in a high impedance output. The output of the comparator is tied to the base of NPN transistor Q1 and, when high, it does not affect the operation of the current regulator 614. When the inverting input to 500 exceeds the reference voltage $V_{REF}$, then the output of 500 comparator will go low and pull the base of Q1 low that turns off Q1 and therefore the LED's 100 current flow. The LED current flow will remain off, protecting Q1 from excessive power dissipation, until the overvoltage condition clears and the output of 500 goes back to a high impedance state. The output pins of comparators 306 and 500 are tied together at the base of the NPN transistor Q1 and either one pulling low will turn off the LED current. Thus the LEDs and Q1 are protected from excessive current and/or voltage and the maximum power that any circuit component dissipates is limited.

Figure 7:
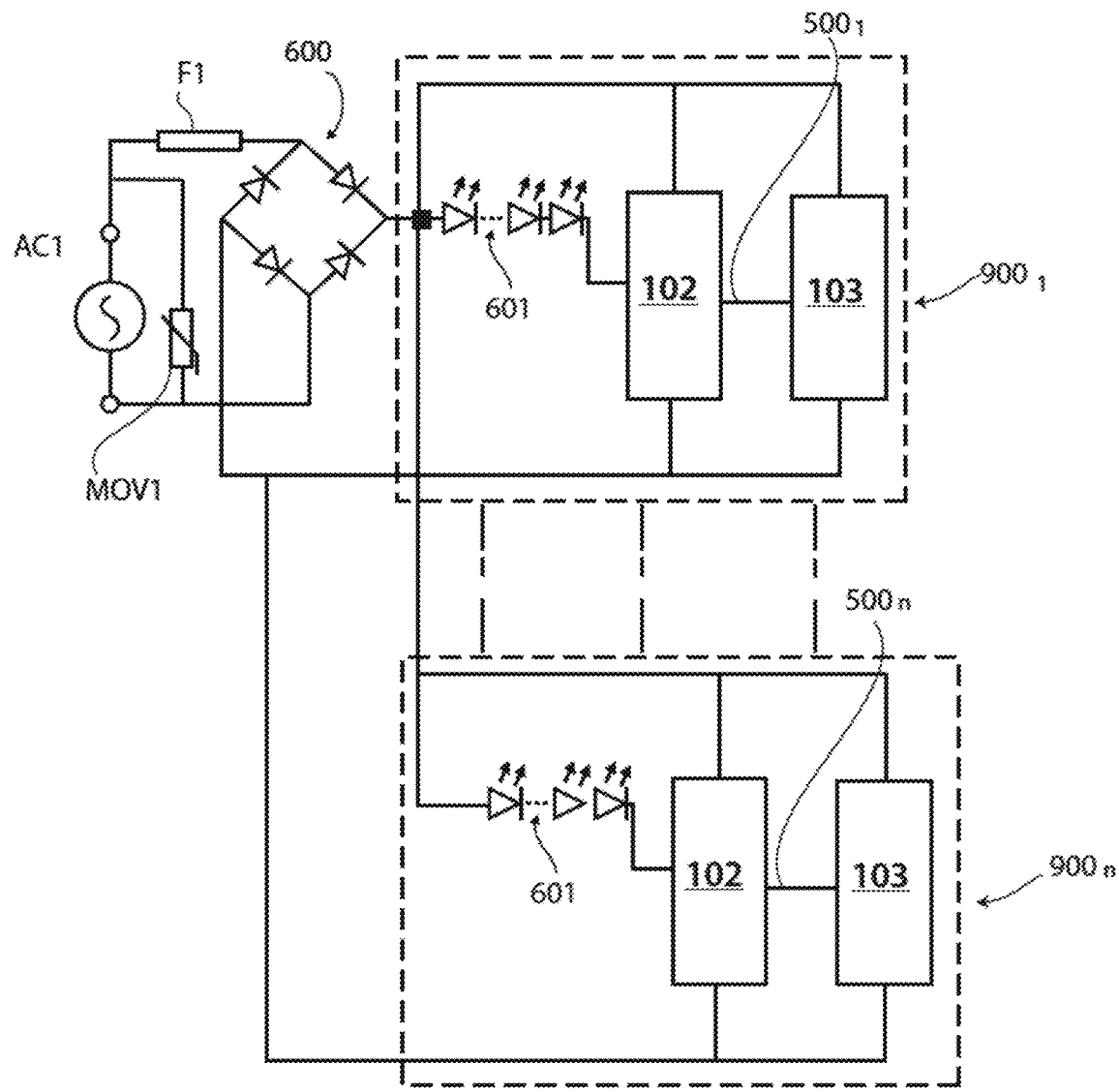
FIG. 7 is a block diagram based on the block diagram of FIG. 1 with additional strings of LEDs added, each string with its own current regulation and voltage detection.

FIG. 7 is an expansion of the circuit of FIG. 3, into multiple strings of LEDs. In this case the same fuse F1 and bridge rectifier 600 are used to drive all of the LED strings with associated circuitry 900$_1$ to 900$_n$ in parallel as shown. An example where this can be useful is in the replacement of linear fluorescent bulbs with LED equivalents. For instance if the LED luminance requires 40 LEDs per foot for an equivalent output then two strings could be used for a 24" replacement bulb and four strings for a 48" replacement bulb. Separate Voltage Detectors could be an advantage if the strings are widely separated and the driving voltage is lower due to IR voltage drop on the connecting cable between them. Also, if the strings were in separate enclosures daisy chained together by a cable one less cable wire would be needed.

Figure 8:
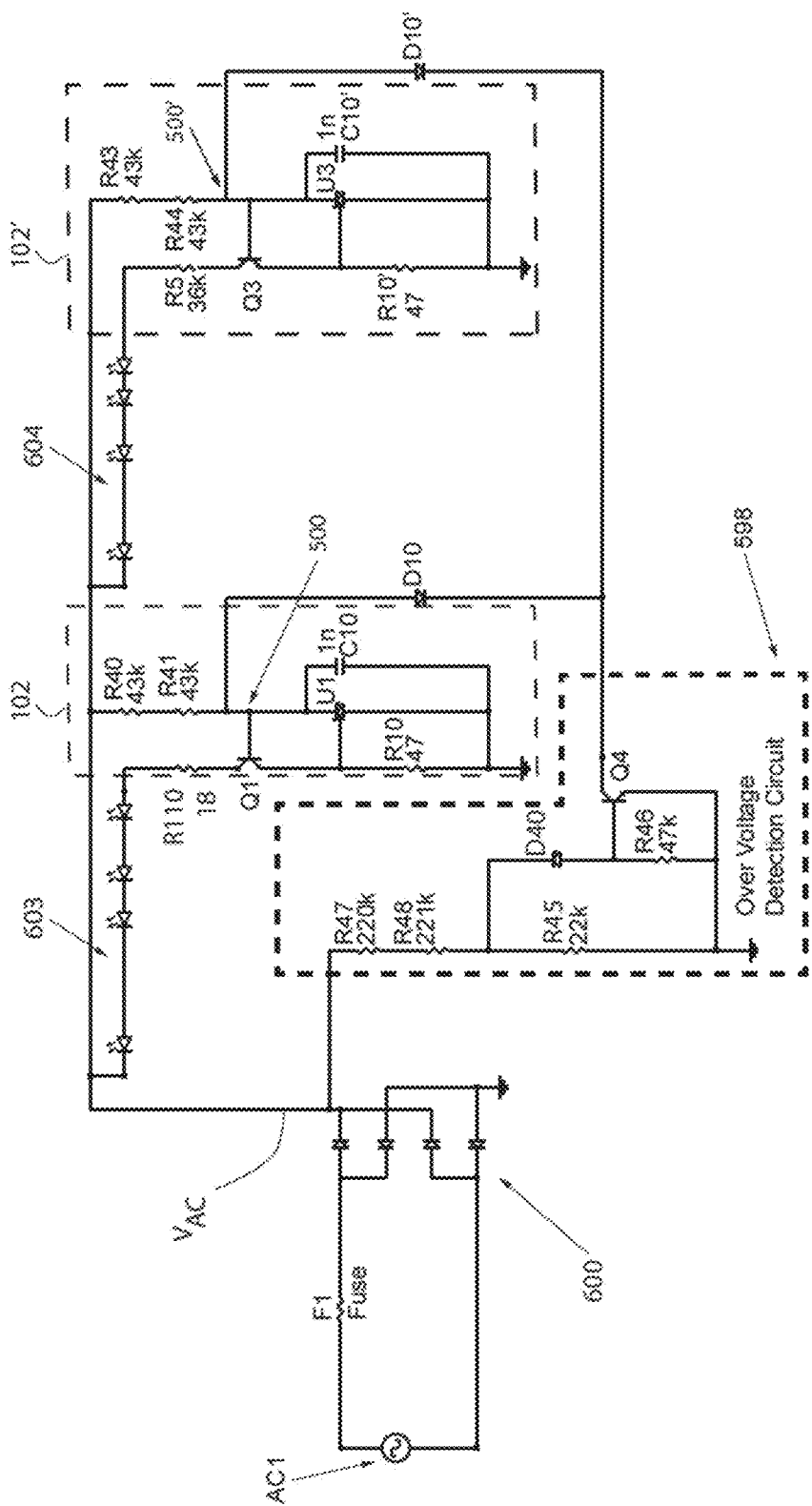
FIG. 8 is a schematic of an LED driver with a single overvoltage detection circuit controlling two separate LED strings.

FIG. 8 shows a schematic of an alternate circuit for driving multiple LED strings. FIG. 8 shows that a single overvoltage detection circuit 598 can be used to control multiple LED current regulator circuits that are each controlling individual LED strings via respective control points. In this circuit there are two distinct LED strings 603 and 604, each current-controlled by distinct instance of the circuit 102. In contrast to the block diagram of FIG. 7, however, they share a common overvoltage circuit 598. This OVD circuit differs from the OVD circuit in FIG. 3 and other, previous figures. A voltage divider of R45 and the sum of R47 and R48 is used to bring the sensed voltage into a lower range and allow the use of a single low voltage Zener D40. Alternatively, a high voltage Zener or several Zeners in series could be used. Another refinement seen in FIG. 8 is the use of two resistors in series in several places including R40 and R41. This avoids a single point of failure of a shorted resistor putting an excessive voltage into the circuit.

Non-Rectified Embodiment

Figure 9:
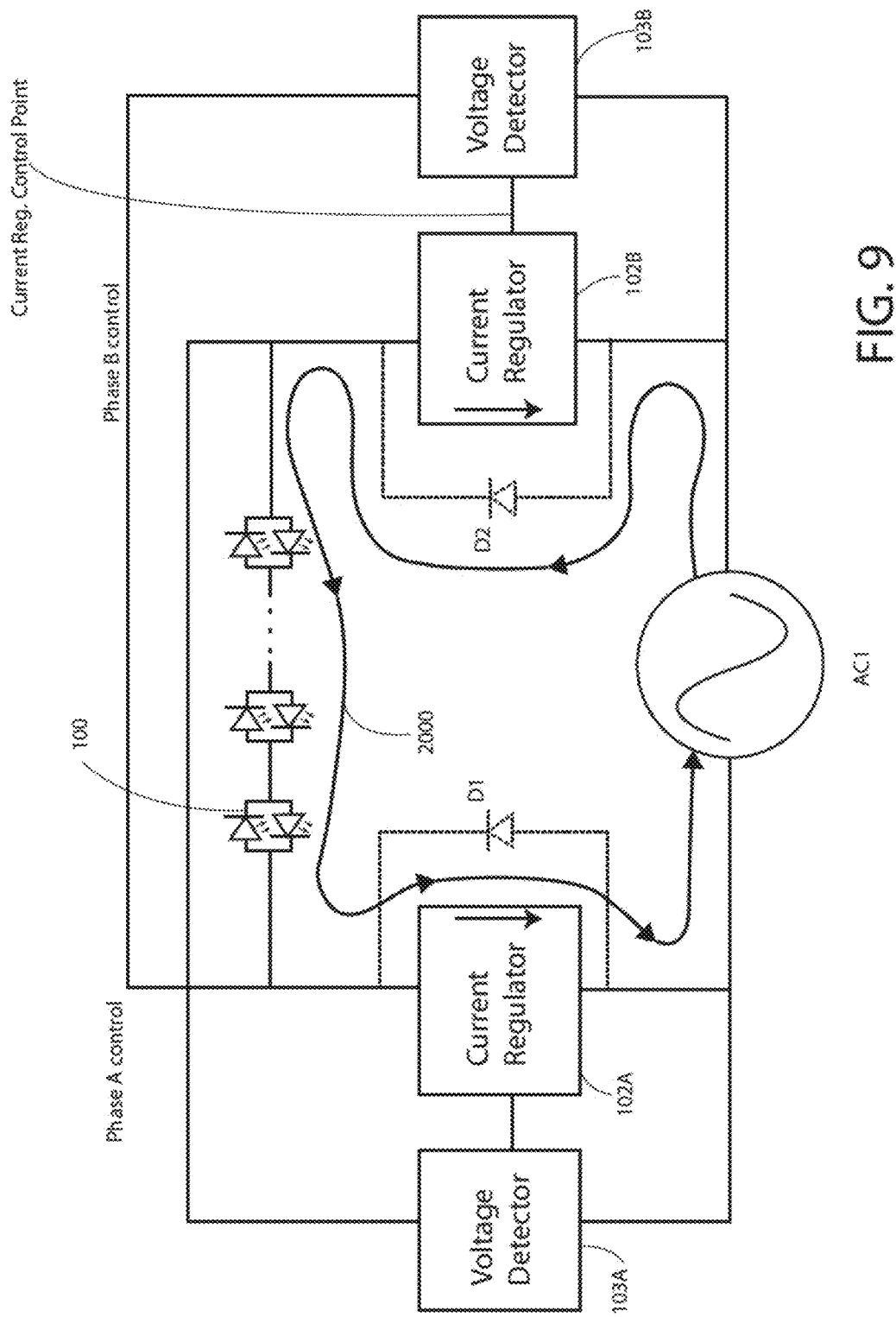
FIG. 9 is a block diagram of a circuit for controlling the current through LEDs and providing over power protection in a non-filtered, non-rectified, symmetric, two-phase scheme.

There are ways to take advantage of these teachings using circuits without any rectification at all. FIG. 9 shows another way to apply the same core circuitry. In this case, rather than having a full wave bridge rectifier, there are dual current regulators and dual OVD circuits, one per phase.

The choice to use the non-rectified embodiment really depends on the type of lighting that is being manufactured using this method. When using a string of LEDs 100, the number of LEDs used will depend on the forward voltage at the desired LED current. The total voltage drop across the string 100 needs to be less than the peak voltage of the AC source at its lowest nominal level. For an 117 VAC source, this might be taken as 10% below or 117V*1.414/1.10=150V. Lower than this will decrease the amount of dimming during a brownout (voltage droop) condition but will also reduce the efficiency during normal voltage conditions. Lower LED voltage drop also relates to fewer LEDs used in series, which will reduce the lumens output during normal voltage conditions. This is one of the tradeoff decisions to be made when creating a light source using these teachings.

A dual phase current regulator with overvoltage detection used with a string of AC LEDs is shown in block diagram form in FIG. 9. An AC LED is a type of LED that illuminates when current flows in either direction. A standard LED only operates in one direction. Alternatives to AC LEDs are back-to-back LEDs or back-to-back LED strings could be used in this circuit. There is no rectification or step down of the raw AC mains. Here a dual phase control circuit is shown as a phase A section and a phase B section. Each section has a respective current regulator 102A 102B and overvoltage detection circuit 103A 103B. These can be identical circuits to the current regulator 102 of FIG. 3 previously discussed.

The AC LED string is represented by a string of pairs of LEDs in parallel in opposite directions.

Figure 10:
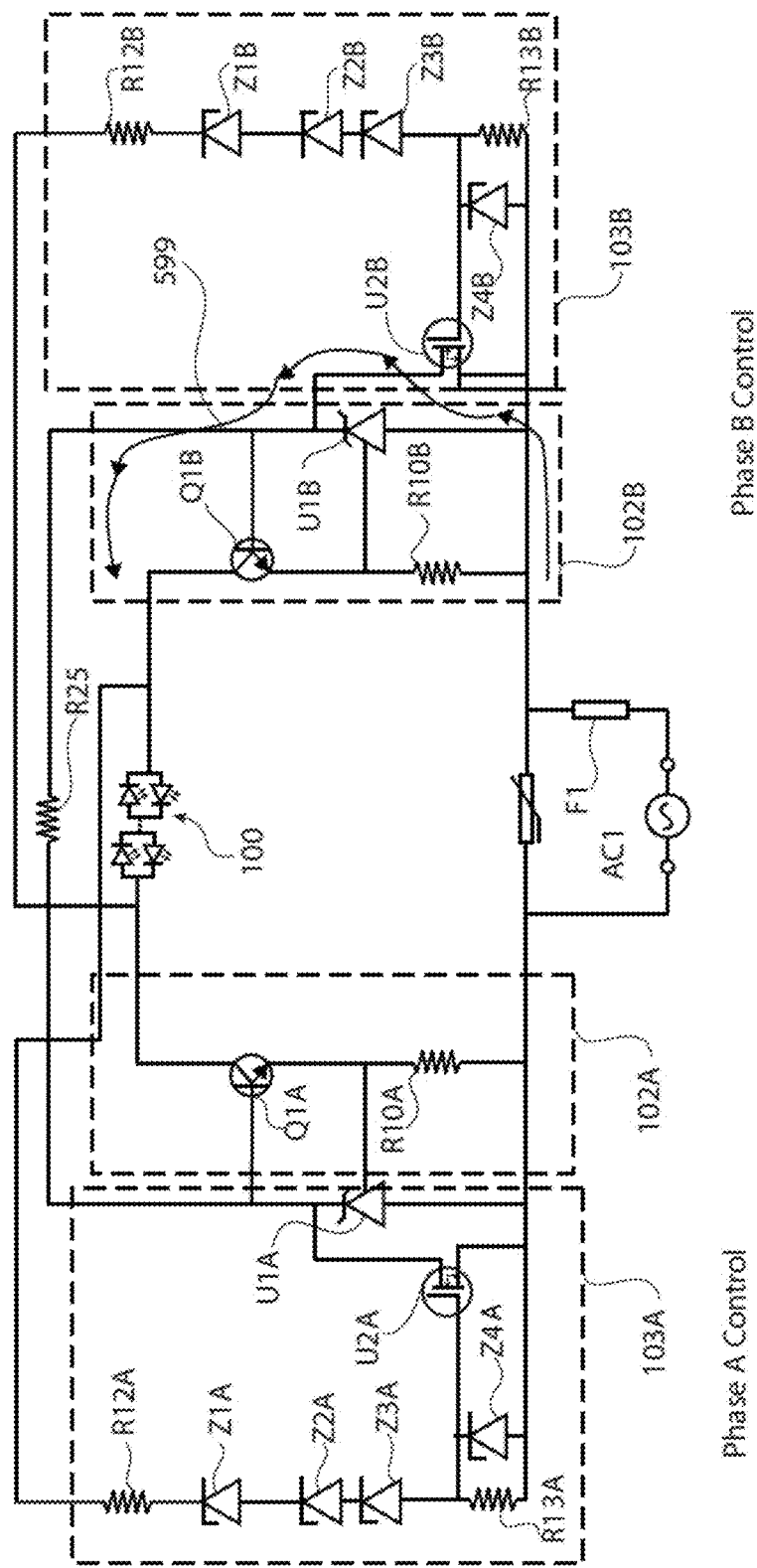
FIG. 10 is a detailed schematic of a circuit corresponding to the block diagram of FIG. 9.

During Phase A the current flows as shown by arrows 2000. During that phase the current regulator 102A and voltage detector 103A are active and control the current seen by the AC LEDS. The voltage detector 103B and the current regulator 102B of the Phase B side are not functioning during Phase A since they are biased opposite to that required to operate. Diode D2, shown dashed, allows the current path 2000 to get current "backwards" through the phase B side during Phase A. It is shown dashed because some implementations of the current regulator 102B may have an inherent diode path in this direction and a discrete D2 would not be required. As clearly seen in FIG. 9, the mains waveform, the LEDs, and the phase A/phase B circuits are completely symmetric. Therefore the operation during Phase B is a mirror image of the operation in Phase A Detailed Two-Phase Circuit FIG. 10 shows a circuit representing the scheme of FIG. 9 at a deeper lever of detail. As mentioned above, when 102A is actively regulating current, the voltage is sourced via 102B with the current path 599 shown in FIG. 10. The source current flows through the U1B anode to cathode diode and then through the Q1B base/emitter (P/N) junction to the LED string. Resistor R25 supplies bias current to power U1A that sources from U1B's cathode during this phase. When the phase switches, current flows in the other direction through R25 to power U1B coming from U1A's cathode, and importantly, the current 599 flows in the opposite way through the LEDs. The parts list for the Dual Phase AC LED Interface shown in FIG. 10 is seen in table 1.

Other LED Circuits Using a Control Point

Figure 11:
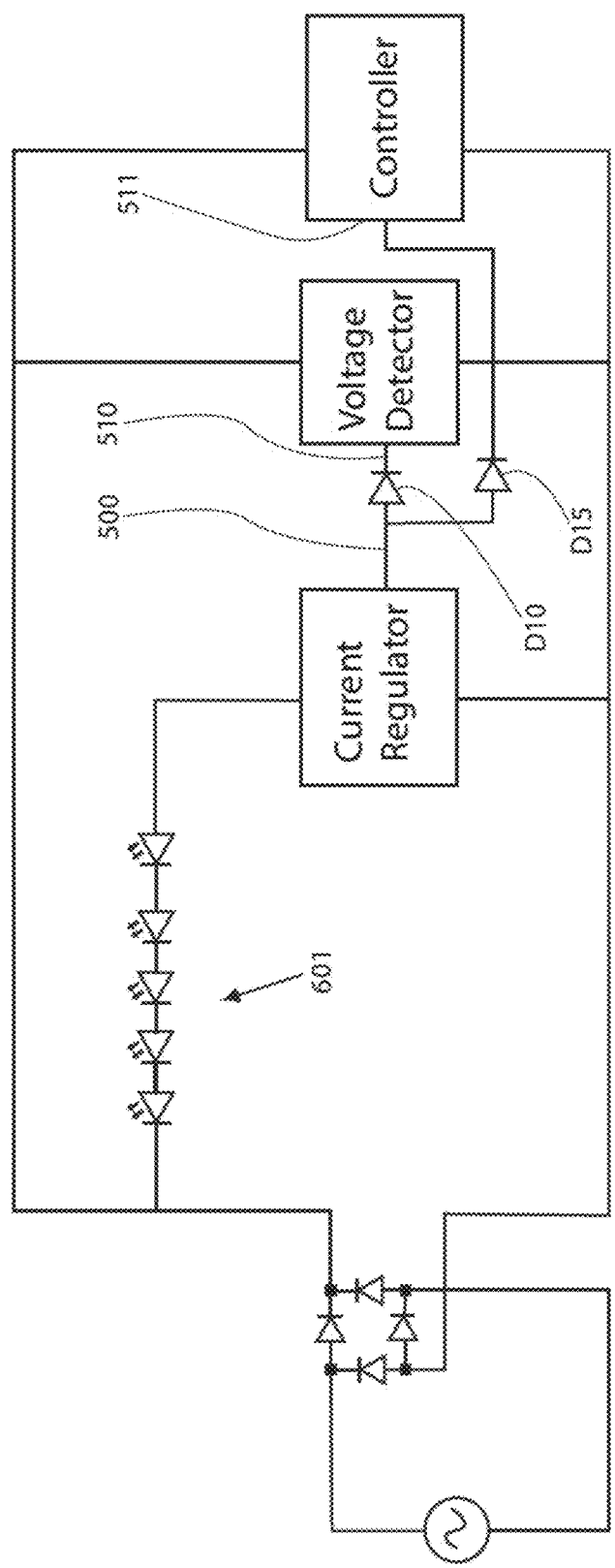
FIG. 11 shows a block diagram based on the bock diagram of FIG. 1 with an additional, optional control block.

In many of the figures described above the LED current can be shut off by an overvoltage circuit pulling down the circuit point formed by the base of NPN transistor Q1 and the cathode of the shunt regulator U1, as seen FIG. 3, for example. This point is the wire-ORed control point, as mentioned above. Its characteristics are a high impedance, low voltage point, that when taken to ground shuts off the current regulator. FIG. 11 is a block diagram level drawing illustrating a generic use of a low voltage control point for shutting down the regulator u[on an overvoltage condition, or controlling the regulator via another arbitrary control circuit using diode isolated wired-OR logic.

Overtemperature

Figure 12:
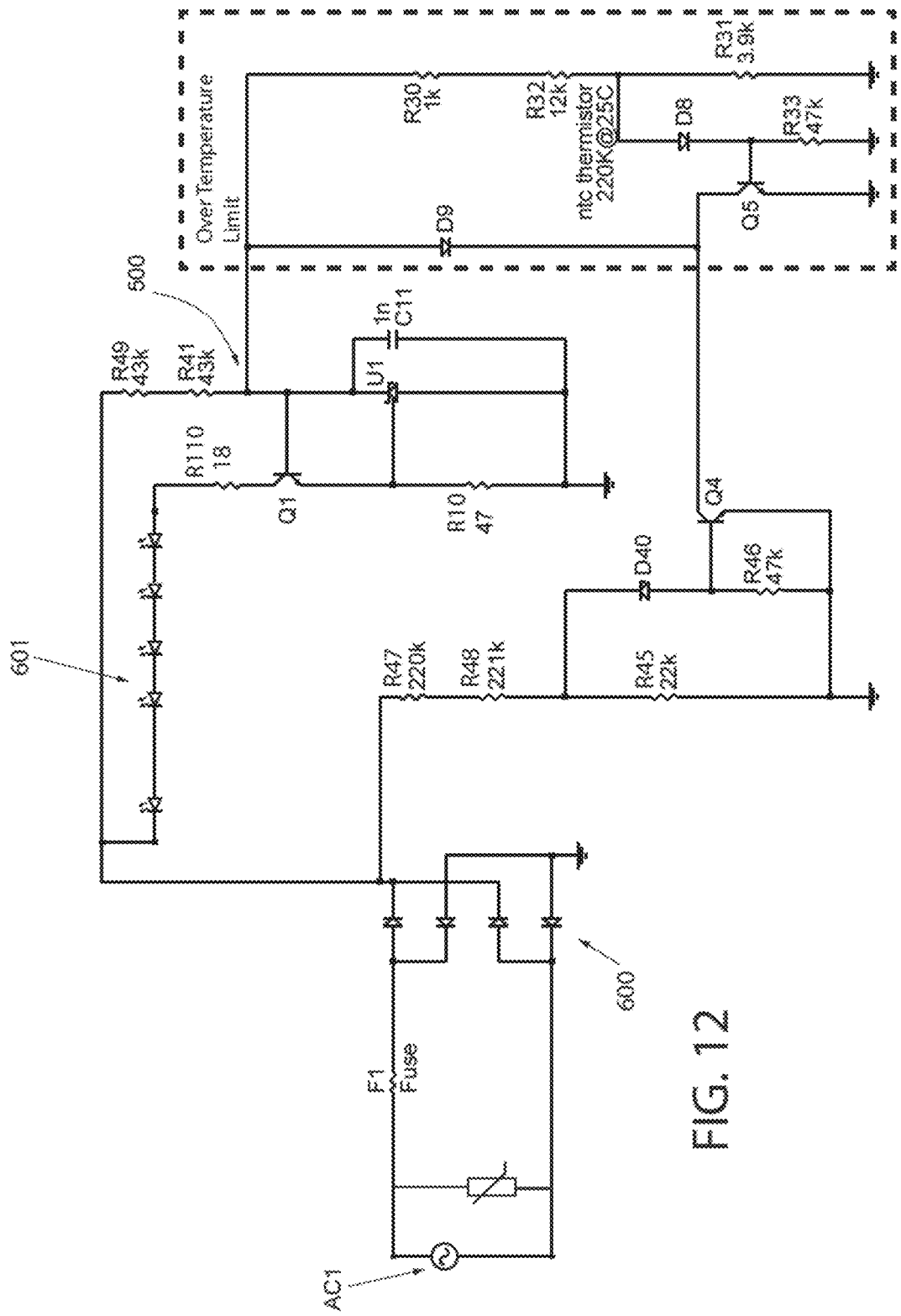
FIG. 12 is a schematic of an LED driver with current regulation, voltage protection and overtemperature detection circuit.

As an example of the use of another control block, an overtemperature circuit is seen in FIG. 12 that is formed similarly to the overvoltage detection circuit, but with an NTC thermistor R32 in series with the sensing resistor voltage divider R30 R31 as seen in this schematic. The top of the voltage divider R30 is connected to the control point 599A where there is a fairly constant 3V during the time when the current regulator is turned on.

The LED current is reduced or cut off for the whole portion of the phase that the bridge voltage is high enough to turn on the regulator. The circuit gradually transitions the current lower as the thermistor resistance drops low enough to start turning on transistor Q5. The result is a reduction in power drawn by the LED string and dissipated by the current regulator output transistor. With the component values shown, the light will still illuminate but at a reduced lumen output during this state until the thermistor temperature reaches 100 C at which point the current regulator and light output will be completely shut down. As long as both the Overvoltage Detection circuit and the Overtemperature Limit circuit are open collector type outputs either or both circuits conducting and pulling the control point low will shut down the LED current.

Dimming Control

Figure 13:
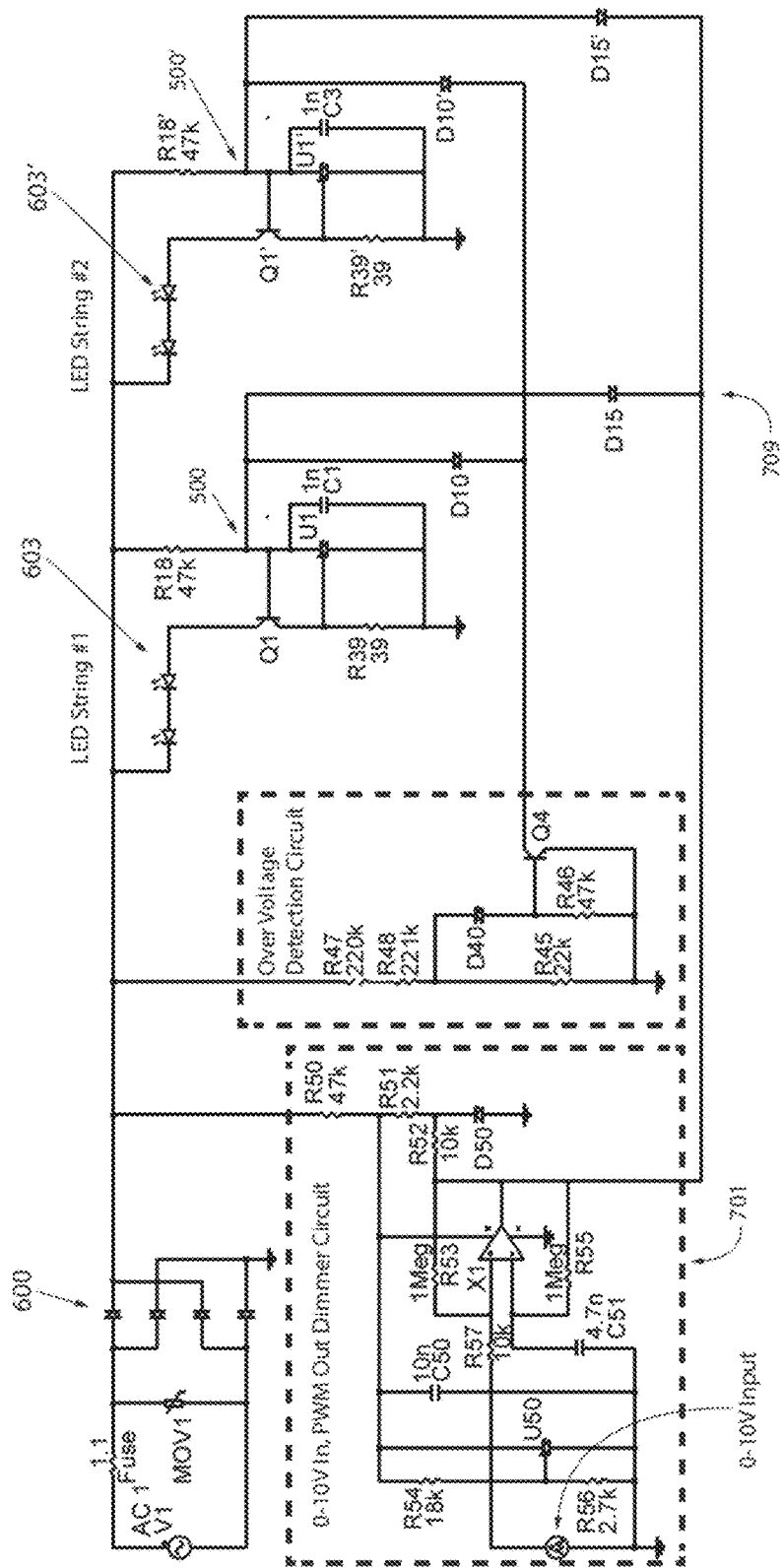
FIG. 13 is a schematic of an LED driver with the addition of PWM intensity modulation.

Also, a PWM signal could drive the same control point at a repetition rate greater than the input line voltage frequency to control the percentage of time that an LED string is on. A schematic of an example embodiment of a PWM control is seen in FIG. 13. This can be used to enable functions such as dimming the light or controlling the color of the light if different color light strings are individually controlled. The PWM signal 709 can be created by a linear circuit 701 that converts a 0-10V input to a proportionally (as seen in FIG. 13) or logarithmically related pulse width modulated signal. In FIG. 13 a PWM control is shown in conjunction with an overvoltage circuit. Alternatively, a microcontroller could perform the translation and produce the PWM signal (not shown). Another method would be to use a wireless module such as Bluetooth or Zigbee to bring the desired dimming level into an enclosed fixture or lamp and drive a PWM signal to the current regulator control points.

Power Factor Control

Figure 14:
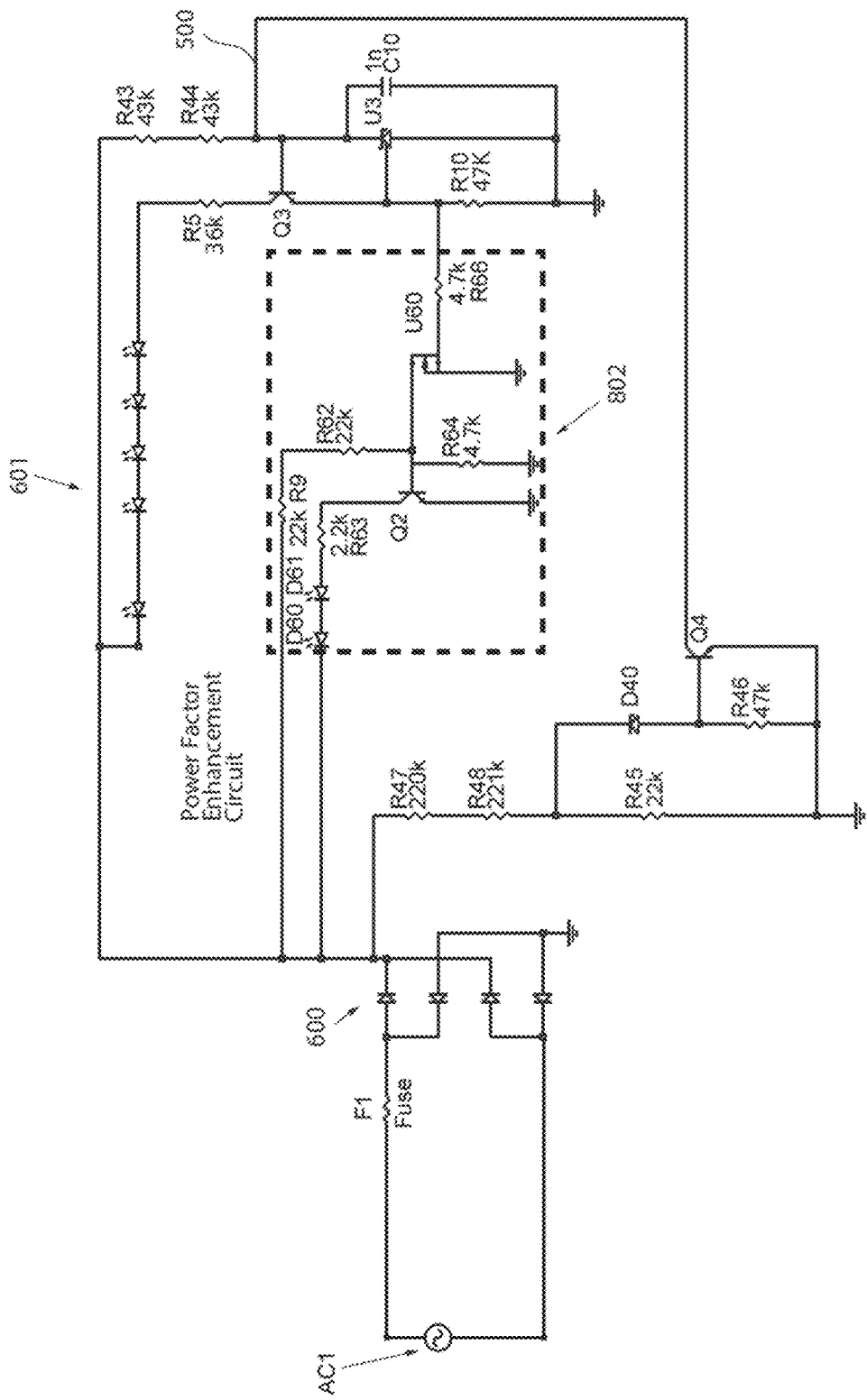
FIG. 14 is a schematic of an LED driver with the addition of a power factor correction circuit.
Figure 15:
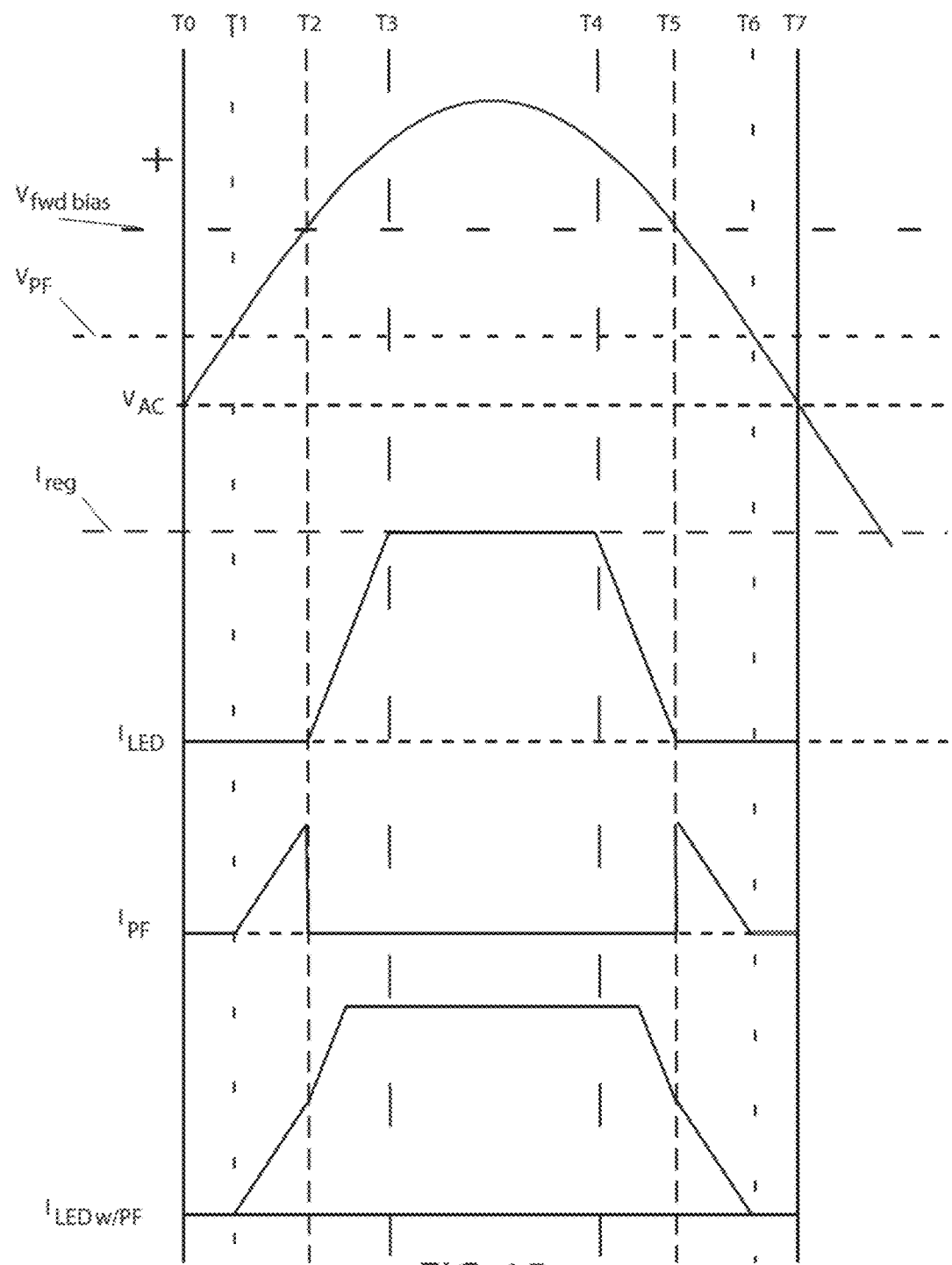
FIG. 15 shows voltage and current waveforms illustrating the operation of the power correction circuitry of FIG. 14.

The control point technique can also be used to improve the power factor of a design; this is shown in the schematic of FIG. 14 and the waveforms of FIG. 15. A power factor enhancement correction circuit 802 is shown working in conjunction with an overvoltage circuit. The power factor enhancement circuit controls a small number of LEDs D60, D61 that are electrically separate from the primary string of LEDs 601. The theory of operation of the power factor circuit is to draw some current and produce some light at parts of the half cycle where the $V_{AC}$ is below the $V_{fwd\ bias}$ of the primary string of LEDs.

Near the beginning of each half cycle voltage phase at time T1, as seen in FIG. 15, a current $I_{PF}$ starts to flow through the short string. This is due to the much lower forward bias voltage required by the short string of LEDs. As seen in FIG. 15, when the $V_{AC}$ reaches $V_{PF}$, which is the sum of the forward bias voltages of the short string current $I_{PF}$ starts flowing. The circuit that controls $I_{PF}$ includes an N channel MOSFET U60. A particular example MOSFET is ZXMN2A02N8. MOSFET U60 is turned on by the voltage across current sense resistor R10, pulling the MOSFET's drain low and bringing the base to emitter voltage of U60 near zero. This turns off the power factor enhancement circuit. The NPN transistor Q2 is turned on by the input voltage, supplying base current via base resistors R9 and R62. This could be one resistor, but two are shown in FIG. 14 to handle single fault failure modes. When Q2 turns on, it draws current from the input source via R63, which dissipates the excess power.

FIG. 15 shows current and voltage waveforms related to the power factor correction circuit. This $V_{AC}$ waveform is similar to the $V_{AC}$ waveform of FIG. 2 but shown on an enlarged timescale. Below the $V_{AC}$ waveform is the $I_{LED}$ current waveform, again, the same as the waveform shown in FIG. 2, but on an enlarged timescale. With a power enhancement circuit, this represents the current through the main LED string. Below that current waveform is $I_{PF}$, this represents the current through the smaller string. As seen in FIG. 14 that is diodes D60 and D61. The total current drawn from the AC source is shown below that waveform as $I_{LED\ W/PF}$, which signifies the sum of current through the two LED strings. Because the total current drawn with power factor circuit is somewhat closer to a sine wave than the original $I_{LED}$ the power factor is increased. This also provides an increase in efficiency.

Modularity Using the Common Control Point

Since the circuits described above all take advantage of a single open collector driven control point that can be diode-ORed together, there is an inherent support for modularity. A system might be composed of separately packaged modules that snap together mechanically and pass the control point between them. A user or configurer could add or subtract distinct strings of LEDs, overvoltage, overtemperature, and PWM modules to produce a desired instance of a system.

Improved Efficiency Circuit

Figure 16:
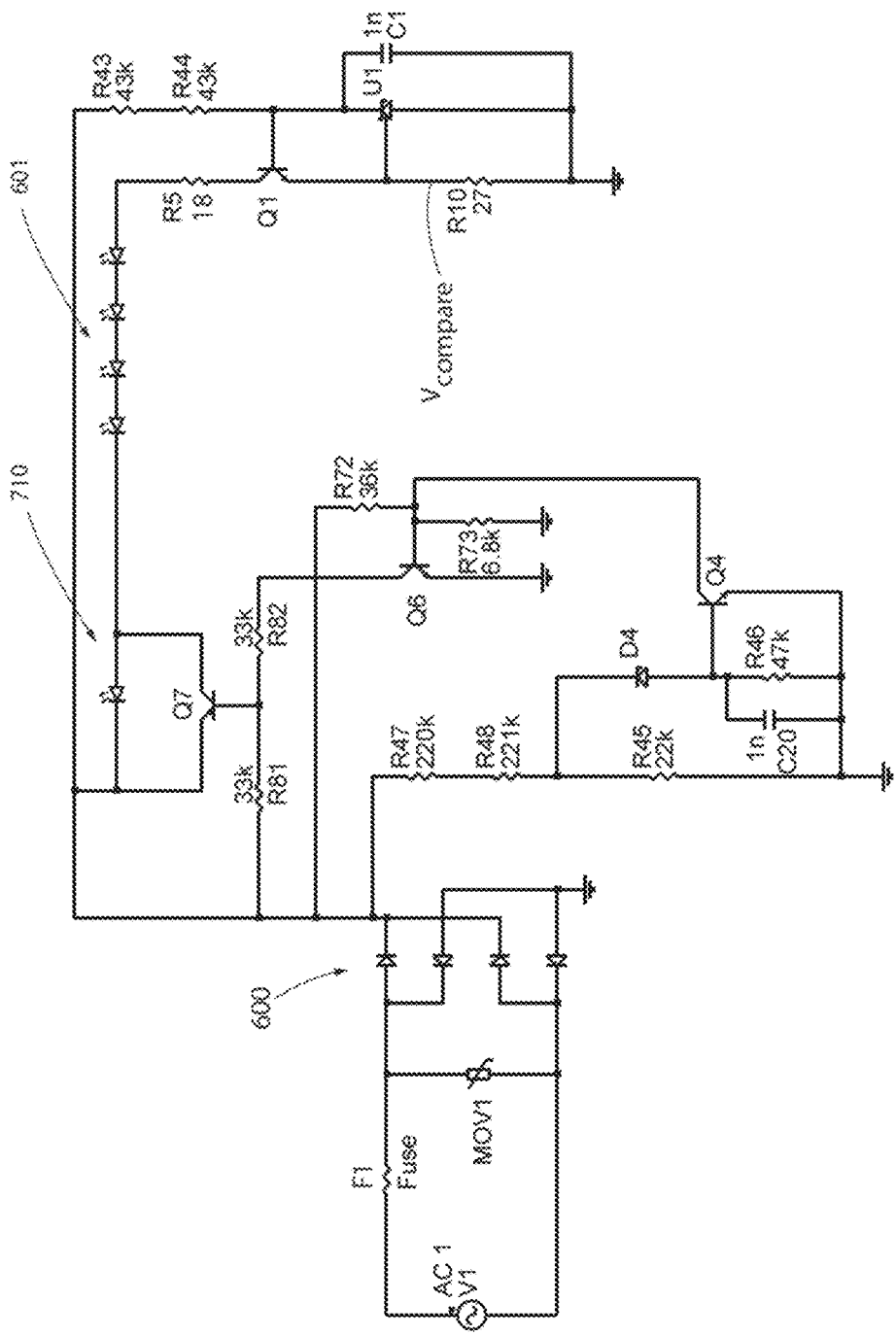
FIG. 16 is a schematic of an LED driver circuit with selective shorting of one LED for improved over-all efficiency.

An efficiency improvement circuit is shown in FIG. 16 that shorts one LED in an LED string at the leading lower voltage part of the bridge AC voltage phase. This allows the balance of the LED string to turn on earlier in the phase. The bridge voltage is sensed by the same type of circuit used for overvoltage detection but it's output is used to turn off the transistor switch Q7 that is shorting across the extra LED 710 in the string. This increases the lumen output of the string during the higher voltage period of the bridge AC voltage. The net result is a longer 'on' time for a slightly reduced version of the LED string and additional output during the peak periods. The current limiting circuit's sink transistor has less voltage across it during the peak periods as well so the total 'lost' power is reduced. Efficiency=Lumens/Watts is improved. Although FIG. 16 shows a single LED, it can be multiple LEDs. In an alternate embodiment, more than one voltage point could be detected for a ladder of separately short-able LED segments. The core concept of these improved efficiency circuits could be applied to any of the preceding embodiments.

In Addition—3 Way Edison Bulb

Figure 17:
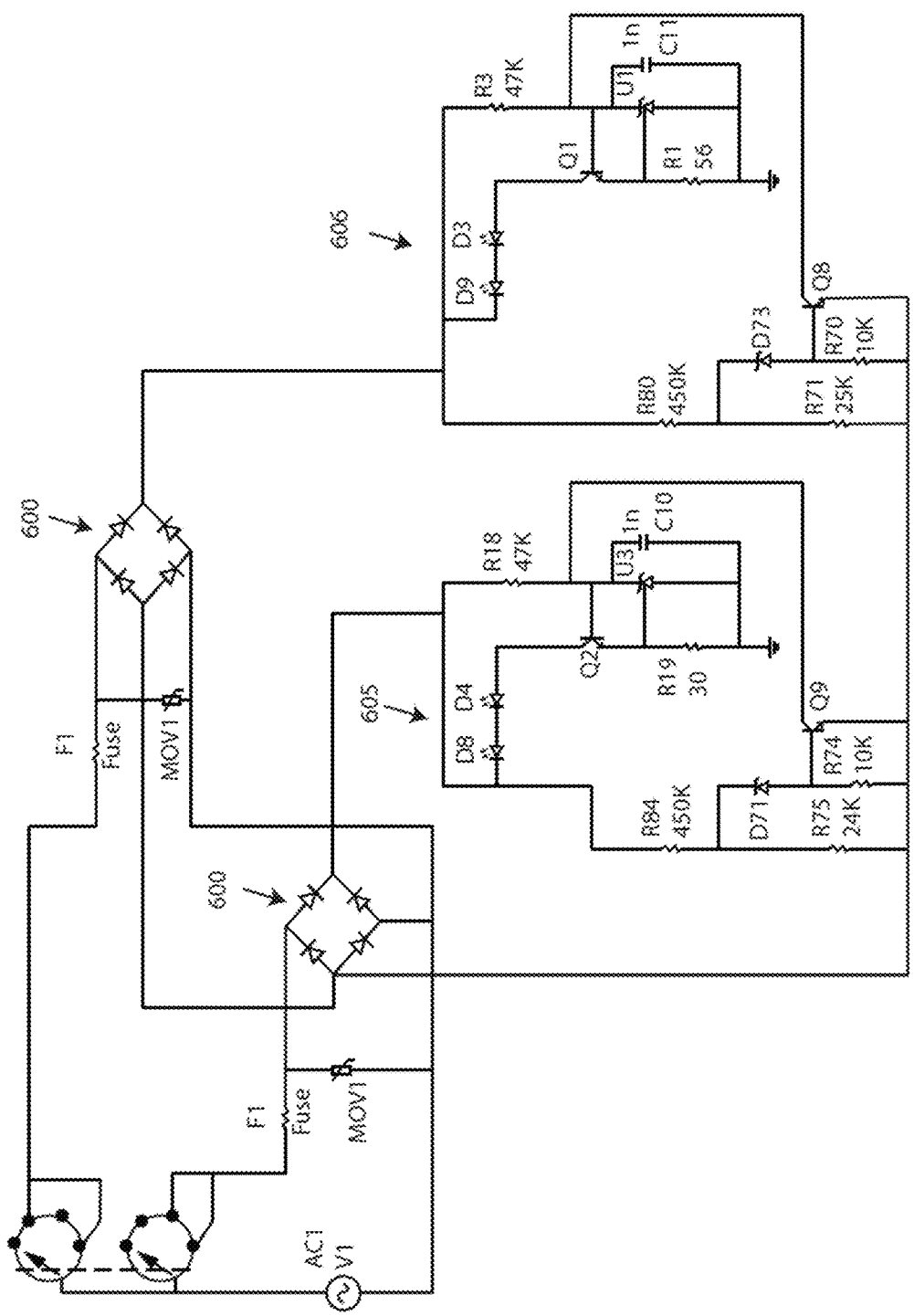
FIG. 17 is a schematic of an LED driver circuit with current regulation, voltage detection and two LED strings to implement a 3-way Edison bulb replacement.

A 3-way Edison bulb can be produced with two LED strings that are individually powered by each contact on the bottom of the base as shown in FIG. 17. Alternatively, another single string of LEDs could be used with the input driven by either/both contacts, but a sensing circuit detects which combination of contacts are powered and controls a PWM signal into its current regulator's control point to create the three different amounts of illumination. That alternate embodiment achieves a similar result.

Reference Number Table

Table 1 shows part numbers, reference number, and corresponding figure numbers.

TABLE 1

| Reference # | Description | Part # | Used in FIGS. |
|---|---|---|---|
| C1 | Capacitor, High Frequency Filter | 1 nF | 13, 16 |
| C10 | Capacitor, High Frequency Filter | 1 nF | 6, 8, 14, 17 |
| C10' | Capacitor, High Frequency Filter | 1 nF | 8, |
| C11 | Capacitor, High Frequency Filter | 1 nF | 12, 17 |
| C20 | Capacitor, High Frequency Filter | 1 nF | 16 |
| C3 | Capacitor, High Frequency Filter | 1 nF | 13 |
| D10 | isolation diode | low current Schottky diode - MBR0520 | 11, 13 |
| D10' | isolation diode | low current Schottky diode - MBR0520 | 13 |
| D15 | isolation diode | low current Schottky diode - MBR0520 | 11, 13 |
| D15' | isolation diode | low current Schottky diode - MBR0520 | 13 |
| D40 | Zener Diode Reference | A 6.2 V Zener diode such as the BZX84C6V2 | 8, 11, 13, 14 |
| D50 | Zener Diode Reference | A 10 V Zener diode such as BZX84C10 | 13 |
| D60 D61 | LEDs | Can be same LEDs used in LED string such as 24 V XLAMP type | 14 |
| D70 | Zener Diode | A 6.2 V Zener diode such as the BZX84C6V2. | 17 |
| 710 | LED | LED diode such as 24 VXLAMP. | 17 |
| D71 | Zener Diode | 6.2 V Zener diode such as the BZX84C6V2. | 16 |
| D73 | Zener Diode | 6.2 V Zener diode BZX84C6V2. | 17 |
| D8 | Diode | | 12 |
| D9 | Diode | | 12 |
| F1 | Fuse | | 1, 3, 5, 6, 7, 13, 16, 17 |
| MOV1 | Metal Oxide Varistor | FZT458 | 1, 3, 5, 6, 7, 13, 16, 17 |
| MOV2 | Metal Oxide Varistor | FZT458 | 17 |
| Q1 | High Voltage NPN Transistor | Q2N2222 | 3, 5, 6, 8, 12, 13, 16, 17 |
| Q1' | High Voltage NPN Transistor | Q2N2222 | 13, |
| Q1A | High Voltage NPN Transistor | Q2N2222 | 10 |
| Q1B | High Voltage NPN Transistor | Q2N2222 | 10 |
| Q2 | High Voltage NPN Transistor | Q2N2222 | 14, 17 |
| Q3 | High Voltage NPN Transistor | Q2N2222 | 8, 14, |
| Q4 | High Voltage NPN Transistor | Q2N2222 | 8, 12, 13, 14, 16 |
| Q5 | High Voltage NPN Transistor | Q2N2222 | 12 |
| Q6 | High Voltage NPN Transistor | Q2N2222 | 16 |
| Q7 | P MOSFET | A P-channel MOSFET such as RFD15P05 | 16 |
| Q8 | trans. In 3-way circuit | Low voltage PNP transistor - BC848C | 17 |
| Q9 | trans. In 3-way circuit | Low voltage PNP transistor - BC848C | 17 |
| R1 | resistor | 56 | 17 |
| R3 | resistor | 47 K | 17 |
| R5 | resistor | 18 | 8, 14, 16 |
| R9 | resistor | 22 K | 14 |
| R10 | Sense Resistor | 47 | 3, 5, 6, 8, 12, 14, 16 |
| R10' | Sense Resistor | 47 | 8 |
| R10A | Sense Resistor | 47 | 10 |
| R10B | Sense Resistor | 47 | 10 |
| R12 | OVD Bias Resistor | Around 56 K | 3, 5, 6 |

TABLE 1-continued

| Reference # | Description | Part # | Used in FIGS. |
|---|---|---|---|
| R12A, R12B | Resistor | Around 56 K | 10 |
| R13 | Gate Bleed Resistor | 100 K | 3, 5, 6 |
| R13A | Gate Bleed Resistor | 100 K | 10 |
| R13B | Gate Bleed Resistor | 100 K | 10 |
| R18 | Resistor | 47 K | 13, 17 |
| R18' | Resistor | 47 K | 13, |
| R19 | Resistor | 30 | 17 |
| R21 | Resistor, NPN Base | 1 K | 5, 6 |
| R22 | Resistor, V---Reference Bias | 1 K | 5, 6 |
| R25 | Resistor | 68 K | 10 |
| R31 | Resistor | 3.9 K | 12 |
| R32 | Thermistor | 220 K@25 C | 12 |
| R33 | Resistor, Bleed | 47 K | 12 |
| R39 | Resistor | 39 | 13 |
| R39' | Resistor | 39 | 13 |
| R40 | Resistor | 43 K | 8 |
| R41 | Resistor | 43 K | 8 |
| R43 | Resistor | 43 K | 8, 14, 16 |
| R44 | Resistor | 43 K | 8, 14, 16 |
| R45 | Resistor | 22 K | 8, 12, 13, 14, 16 |
| R46 | Resistor | 47 K | 8, 12, 13, 14, 16 |
| R47 | Resistor | 220 K | 8, 12, 13, 14, 16 |
| R48 | Resistor | 221 K | 8, 12, 13, 14, 16 |
| R11 | Bias Resistor for Current Regulators | 5.6 K | 3, 5, 6 |
| R110 | Resistor | 18 | 8, 12 |
| R49 | Resistor | 43 K | 12 |
| R50 | Resistor | 47 K | 13 |
| R51 | Resistor | 2.2 K | 13 |
| R52 | Resistor | 10 K | 13 |
| R53 | Resistor | 1 M | 13 |
| R54 | Resistor | 18 K | 13 |
| R55 | Resistor | 1 M | 13 |
| R56 | Resistor | 2.7 K | 13 |
| R57 | Resistor | 10 K | 13 |
| R62 | Resistor | 22 K | 14 |
| R63 | Resistor | 2.2 K | 14 |
| R64 | Resistor | 4.7 K | 14 |
| R66 | Resistor | 4.7 K | 14 |
| R70 | Resistor | 10 K | 17 |
| R71 | Resistor | 24 K | 17 |
| R72 | Resistor | 36 K | 16 |
| R73 | Resistor | 6.8 K | 16 |
| R74 | Resistor | 10 K | 17 |
| R75 | Resistor | 24 K | 17 |
| R80 | Resistor | 450 K | 17 |
| R81 | Resistor | 33 K | 16 |
| R82 | Resistor | 33 K | 16 |
| R84 | Resistor | 450 K | 17 |
| U1 | Shunt Voltage Regulator | TL431 | 3, 8, 12, 13, 16, 17 |
| U1' | Shunt Voltage Regulator | TL431 | 13 |
| U1A, U1B | Shunt Voltage Regulator | TL431 | 10 |
| U2 | MOSFET, N---Channel | ZXMN2A02N8 | 3, 5 |
| U2A | MOSFET, N---Channel | ZXMN2A02N8 | 10 |
| U2B | MOSFET, N---Channel | ZXMN2A02N8 | 10 |
| U3 | Shunt Voltage Regulator | TL431 | 8, 14, 17 |
| U4 | Comparator (single) | LM393A | 5 |
| U60 | MOSFET, N---Channel | ZXMN2A02N8 | 14 |
| 100 | String of Light Emitting Diodes (LED) or AC LEDs | | 9, 10 |
| 306 | Dual Open Collector Voltage Comparator (A side) | LM393A | 6 |
| 500 | Dual Open Collector Voltage Comparator (B side) | LM393A | 6 |
| 600 | Bridge Rectifier | | 1, 3, 5, 6, 7, 8, 11, 12, 13, 14, 16, 17 |
| 601 | String of Light Emitting Diodes (LED) | | 1, 3, 5, 6, 7, 11, 12, 14, 16 |
| 603 | String of Light Emitting Diodes (LED) | | 8, 13 |
| 603' | String of Light Emitting Diodes (LED) | | 13 |
| 604 | String of Light Emitting Diodes (LED) | | 8 |

Rectification is turning an AC source into a voltage or current that only flows in one direction. This may be by a half-wave rectifier or a full-wave rectifier. Constant sink current regulators, as shown in these figures, can be implemented with a shunt voltage regulator or a comparator circuit. It can also be embodied in a single integrated circuit or entirely built from transistors. Protecting from excessive power dissipation can be done by many means. Circuits in these figures demonstrate power limitation via constant current and bounded voltage. Alternatives include constant voltage and bounded current and by directly sensing temperature of the component being protected.

Reference herein to "one embodiment" or "an embodiment" means that a particular feature, structure, operation, or other characteristic described in connection with the embodiment may be included in at least one implementation of the invention. However, the appearance of the phrase "in one embodiment" or "in an embodiment" in various places in the specification does not necessarily refer to the same embodiment.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

It is claimed:

1. An LED driver circuit for powering a string of LEDs directly from mains-level AC voltage comprising:
    a constant current sink circuit, the current regulated through a power transistor to a predetermined current level where the current can be turned off by grounding a low voltage control point;
    an overvoltage detection circuit configured to detect the voltage across the string of LEDs plus the voltage across the current sink circuit, the overvoltage detection circuit configured to turn off the sink current via grounding the control point when the total voltage reaches a predetermined value;
    further comprising a PWM circuit diode-coupled to the control point, the PWM circuit operating directly from AC mains with no requirement for a steady DC supply or step-down.

2. An LED driver circuit for powering a string of LEDs directly from mains-level AC voltage comprising:
    a constant current sink circuit, the current regulated through a power transistor to a predetermined current level where the current can be turned off by grounding a low voltage control point;
    an overvoltage detection circuit configured to detect the voltage across the string of LEDs plus the voltage across the current sink circuit, the overvoltage detection circuit configured to turn off the sink current via grounding the control point when the total voltage reaches a predetermined value; and
    a distinct power factor enhancement circuit, the power factor circuit configured to power LEDs distinct from and not directly coupled to a first string of LEDs during a portion of an applied AC voltage cycle where the AC voltage is not sufficient to bias on the constant current circuit.

3. An LED driver circuit for powering a string of LEDs directly from mains-level AC voltage comprising:
    a constant current sink circuit, the current regulated through a power transistor to a predetermined current level and where the current can be turned off by grounding a low voltage control point;
    an overtemperature detect circuit configured to turn off the sink current via a coupling to the control point when temperature reaches a predetermined value;
    further comprising a PWM circuit controlling the intensity of the LEDs via operative coupling to the control point, the PWM circuit operating directly from mains AC without requirement for AC-to-DC filtering or voltage step down.

4. The LED driver circuit of claim 3 further comprising an overvoltage detection circuit diode coupled to the control point.

5. A method of powering a string of LEDs directly from AC mains by a constant sink current circuit comprising:
    a) accepting a non step-down AC mains voltage with or without rectification;
    b) turning on current flow by the constant current circuit when the constant current circuit is biased on by a rising AC voltage;
    c) regulating the current to a constant value while the circuit is biased on and a low voltage control point is high;
    d) turning off the current when the control point is grounded;
    further comprising a PWM circuit driving the control point to ground periodically, achieving dimming; where the PWM circuit is directly powered from AC mains without requirement for step-down or AC-to-DC filtering.

\* \* \* \* \*